US012772315B2

(12) United States Patent
Mourad

(10) Patent No.: US 12,772,315 B2
(45) Date of Patent: Oct. 20, 2026

(54) SYSTEM AND METHOD FOR VEHICLE COMMUNICATION WITH PORTABLE COMMUNICATION APPARATUS

(71) Applicant: Bayerische Motoren Werke Aktiengesellschaft, Munich (DE)

(72) Inventor: Alaa Mourad, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 53 days.

(21) Appl. No.: 18/860,992

(22) PCT Filed: Feb. 14, 2023

(86) PCT No.: PCT/EP2023/053622
§ 371 (c)(1),
(2) Date: Oct. 28, 2024

(87) PCT Pub. No.: WO2023/217424
PCT Pub. Date: Nov. 16, 2023

(65) Prior Publication Data
US 2025/0301523 A1 Sep. 25, 2025

(30) Foreign Application Priority Data
May 10, 2022 (DE) ..................... 10 2022 111 574.7

(51) Int. Cl.
*H04W 76/15* (2018.01)
*H04W 74/0808* (2024.01)
*H04W 84/12* (2009.01)

(52) U.S. Cl.
CPC ....... *H04W 76/15* (2018.02); *H04W 74/0808* (2013.01); *H04W 84/12* (2013.01)

(58) Field of Classification Search
None
See application file for complete search history.

(56) References Cited

U.S. PATENT DOCUMENTS 6,779,125 B1 * 8/2004 Haban .............. H03K 3/356113 713/500
6,816,750 B1 * 11/2004 Klaas .................. G06F 15/7832 700/121
(Continued)

FOREIGN PATENT DOCUMENTS

AU 2015338953 A1 * 4/2017 ........... H04B 17/309
AU 2015338953 B2 * 5/2019 ........... H04B 17/309
(Continued)

OTHER PUBLICATIONS

International Search Report corresponding to International Patent Application No. PCT/EP2023/053622, dated Apr. 6, 2023. (6 pages).
(Continued)

*Primary Examiner* — Berhanu Tadese
(74) *Attorney, Agent, or Firm* — Maginot, Moore & Beck LLP

(57) ABSTRACT

A communication device includes at least one interface for communication with a first wireless transceiver. The communication device further includes one or more processors configured to receive information about an upcoming communication via a second wireless transceiver, and control the first wireless transceiver to emit a signal before the upcoming communication via the second wireless transceiver.

19 Claims, 2 Drawing Sheets

(56) References Cited

U.S. PATENT DOCUMENTS

| | | | | |
|---|---|---|---|---|
| 6,861,982 | B2 * | 3/2005 | Forstrom | G01S 5/02216<br>342/465 |
| 6,912,557 | B1 * | 6/2005 | North | G06F 7/57<br>708/490 |
| 7,054,301 | B1 * | 5/2006 | Sousa | H04B 1/715<br>370/437 |
| 7,106,715 | B1 * | 9/2006 | Kelton | H04L 41/0803<br>370/252 |
| 7,245,893 | B1 * | 7/2007 | Husted | H04B 17/345<br>375/345 |
| 7,519,032 | B2 * | 4/2009 | Soomro | H04W 72/23<br>455/452.2 |
| 7,643,810 | B2 * | 1/2010 | Husted | H03G 3/3078<br>455/226.1 |
| 7,650,151 | B2 * | 1/2010 | Medepalli | H04W 72/542<br>370/232 |
| 7,974,996 | B1 * | 7/2011 | North | G06F 9/3885<br>708/524 |
| 7,995,583 | B2 * | 8/2011 | Del Prado Pavon | H04W 72/20<br>455/574 |
| 8,554,237 | B2 * | 10/2013 | Medepalli | H04W 72/542<br>455/450 |
| 8,594,120 | B2 * | 11/2013 | Mangold | H04W 16/14<br>370/445 |
| 8,600,436 | B2 * | 12/2013 | Haartsen | H04W 72/02<br>455/501 |
| 8,662,995 | B2 * | 3/2014 | Hawkins | A63F 9/04<br>463/24 |
| 8,666,319 | B2 * | 3/2014 | Kloper | H04W 74/0808<br>455/67.11 |
| 8,693,420 | B2 * | 4/2014 | Qu | H04L 5/0051<br>455/450 |
| 8,774,113 | B2 * | 7/2014 | Larsson | H04W 74/002<br>370/329 |
| 9,160,504 | B2 * | 10/2015 | Qu | H04L 5/0048 |
| 9,198,177 | B2 * | 11/2015 | Nanri | H04L 5/0053 |
| 9,398,563 | B2 * | 7/2016 | Zhang | H04W 72/30 |
| 9,467,899 | B2 * | 10/2016 | Gu | H04L 45/247 |
| 9,473,981 | B2 * | 10/2016 | Bhushan | H04L 1/00 |
| 9,510,222 | B2 * | 11/2016 | Yerramalli | H04B 17/00 |
| 9,565,593 | B2 * | 2/2017 | Bhushan | H04L 1/00 |
| 9,694,275 | B2 * | 7/2017 | Hawkins | A63F 9/04 |
| 9,713,035 | B2 * | 7/2017 | Bhushan | H04L 1/00 |
| 9,717,098 | B2 * | 7/2017 | Bhushan | H04L 1/00 |
| 9,723,516 | B2 * | 8/2017 | Bhushan | H04L 1/00 |
| 9,730,105 | B2 * | 8/2017 | Bhushan | H04L 1/00 |
| 9,750,019 | B2 * | 8/2017 | Bala | H04W 16/14 |
| 9,781,633 | B2 * | 10/2017 | Gu | H04L 45/247 |
| 9,794,098 | B2 * | 10/2017 | Kwon | H04W 72/02 |
| 9,826,551 | B2 * | 11/2017 | Agardh | H04W 72/121 |
| 9,929,844 | B2 * | 3/2018 | Damnjanovic | H04L 27/261 |
| 9,954,668 | B2 * | 4/2018 | Lee | H04W 72/0446 |
| 9,961,696 | B2 * | 5/2018 | Wang | H04W 72/1215 |
| 9,974,089 | B2 * | 5/2018 | Salem | H04W 16/14 |
| 10,194,467 | B2 * | 1/2019 | Fodor | H04W 72/12 |
| 10,383,138 | B2 * | 8/2019 | Huang | H04W 28/0247 |
| 11,570,728 | B2 * | 1/2023 | Chande | H04W 52/24 |
| 11,706,800 | B2 * | 7/2023 | Sun | H04W 16/14<br>370/329 |
| 11,974,318 | B2 * | 4/2024 | Chisci | H04W 72/0446 |
| 2003/0093526 | A1 * | 5/2003 | Nandagopalan | H04L 47/24<br>709/225 |
| 2004/0203383 | A1 * | 10/2004 | Kelton | H04L 1/02<br>455/519 |
| 2007/0238482 | A1 * | 10/2007 | Rayzman | H04W 74/04<br>455/63.2 |
| 2008/0279163 | A1 * | 11/2008 | Desai | H04W 72/1215<br>370/328 |
| 2009/0210101 | A1 * | 8/2009 | Hawkins | A63F 9/04<br>700/297 |
| 2015/0126207 | A1 * | 5/2015 | Li | H04W 16/14<br>455/452.1 |
| 2016/0128130 | A1 * | 5/2016 | Sadek | H04W 76/28<br>370/328 |
| 2016/0345276 | A1 * | 11/2016 | Sun | H04W 52/38 |
| 2016/0353482 | A1 * | 12/2016 | Valliappan | H04L 5/22 |
| 2016/0380722 | A1 * | 12/2016 | Hassanin | H04L 1/0045<br>714/776 |
| 2018/0041314 | A1 * | 2/2018 | Lin | H04W 72/1263 |
| 2018/0054835 | A1 * | 2/2018 | Fodor | H04W 72/12 |
| 2019/0182865 | A1 * | 6/2019 | Falahati | H04L 1/1812 |
| 2021/0051660 | A1 * | 2/2021 | Askar | H04L 5/14 |
| 2021/0227478 | A1 * | 7/2021 | Chande | H04W 52/24 |
| 2021/0391963 | A1 * | 12/2021 | Abdelghaffar | H04L 5/0012 |
| 2022/0295509 | A1 * | 9/2022 | Behravan | H04L 5/0053 |
| 2022/0304011 | A1 * | 9/2022 | Zhang | H04L 5/0032 |
| 2022/0312407 | A1 * | 9/2022 | Guthmann | H04W 72/02 |
| 2022/0321307 | A1 * | 10/2022 | Behravan | H04L 5/0055 |
| 2022/0408468 | A1 * | 12/2022 | Jang | H04W 72/1273 |
| 2023/0016937 | A1 * | 1/2023 | Jang | H04B 7/0628 |
| 2023/0028259 | A1 * | 1/2023 | Jang | H04L 1/08 |
| 2023/0029850 | A1 * | 2/2023 | Park | H04L 1/0009 |
| 2023/0045905 | A1 * | 2/2023 | Lim | H04W 52/365 |
| 2023/0209527 | A1 * | 6/2023 | Jang | H04W 72/046<br>370/330 |
| 2023/0300891 | A1 * | 9/2023 | Su | H04L 5/0048<br>370/329 |
| 2023/0327977 | A1 * | 10/2023 | Abedini | H04W 40/02 |
| 2023/0389070 | A1 * | 11/2023 | Sun | H04W 16/14 |
| 2024/0008024 | A1 * | 1/2024 | Jung | H04L 1/1812 |
| 2024/0073930 | A1 * | 2/2024 | Khoryaev | H04L 1/1614 |
| 2024/0155666 | A1 * | 5/2024 | Khoryaev | H04W 72/20 |
| 2024/0259119 | A1 * | 8/2024 | Xia | H04B 17/345 |
| 2024/0267825 | A1 * | 8/2024 | Zhang | H04W 40/22 |
| 2024/0313931 | A1 * | 9/2024 | Lim | H04W 72/23 |
| 2025/0039850 | A1 * | 1/2025 | Umehara | H04L 5/0007 |
| 2025/0063518 | A1 * | 2/2025 | Choi | H04W 52/46 |
| 2025/0089035 | A1 * | 3/2025 | Lee | H04L 5/001 |
| 2025/0106853 | A1 * | 3/2025 | Hassan | H04W 72/20 |
| 2025/0158774 | A1 * | 5/2025 | Jang | H04B 7/024 |
| 2025/0176054 | A1 * | 5/2025 | Jang | H04L 5/0023 |
| 2025/0301523 | A1 * | 9/2025 | Mourad | H04W 74/0808 |
| 2025/0358047 | A1 * | 11/2025 | Park | H04L 1/0009 |

FOREIGN PATENT DOCUMENTS

| | | | | |
|---|---|---|---|---|
| CN | 102045386 A | * | 5/2011 | H04L 47/32 |
| CN | 102970738 A | * | 3/2013 | H04W 52/0238 |
| CN | 107113626 A | * | 8/2017 | H04W 16/14 |
| CN | 107409311 A | * | 11/2017 | H04L 1/188 |
| CN | 107925528 A | * | 4/2018 | H04L 5/0007 |
| CN | 107926048 A | * | 4/2018 | H04W 72/23 |
| CN | 108370546 A | * | 8/2018 | H04W 72/04 |
| CN | 108476481 A | * | 8/2018 | H04W 72/23 |
| CN | 108886751 A | * | 11/2018 | H04W 72/23 |
| CN | 109792591 A | * | 5/2019 | H04W 4/48 |
| CN | 109845390 A | * | 6/2019 | H04W 72/12 |
| CN | 110999507 A | * | 4/2020 | H04W 72/0446 |
| CN | 107113880 B | * | 6/2020 | H04W 74/0816 |
| CN | 106538028 B | * | 7/2020 | H04W 74/0808 |
| CN | 107409311 B | * | 1/2021 | H04L 1/188 |
| CN | 112335310 A | * | 2/2021 | H04W 16/26 |
| CN | 107113626 B | * | 6/2021 | H04B 17/309 |
| CN | 110268793 B | * | 3/2023 | H04L 5/0053 |
| CN | 109845390 B | * | 5/2023 | H04W 74/0816 |
| CN | 113196859 A | * | 11/2024 | H04W 16/14 |
| CN | 113196859 B | * | 11/2024 | H04W 16/14 |
| CN | 119096688 A | * | 12/2024 | H04W 74/0808 |
| DE | 102013105589 A1 | * | 12/2013 | H04W 76/16 |
| DE | 102013203947 A1 | * | 9/2014 | G08C 17/02 |
| DE | 102013105589 B4 | * | 3/2019 | H04W 76/16 |
| DE | 102018208094 A1 | * | 11/2019 | B60R 25/245 |
| DE | 102018212811 A1 | * | 2/2020 | H04N 21/43637 |
| DE | 102019100873 A1 | * | 7/2020 | G01C 21/04 |
| DE | 102022111574 A1 | * | 11/2023 | H04W 74/0808 |
| DE | 102022127612 A1 | * | 4/2024 | H04L 67/125 |
| EP | 1289172 A2 | * | 3/2003 | G01S 5/0244 |
| EP | 2630829 B1 | * | 1/2018 | H04W 72/541 |
| EP | 3205137 B1 | * | 8/2018 | H04B 17/309 |
| EP | 3944588 A1 | * | 1/2022 | H04W 4/023 |

(56) References Cited

FOREIGN PATENT DOCUMENTS

| | | | | | |
|---|---|---|---|---|---|
| EP | 3962217 | A1 | * | 3/2022 | H04W 72/1215 |
| EP | 4322670 | A1 | * | 2/2024 | H04W 72/563 |
| EP | 3900471 | B1 | * | 11/2025 | H04W 16/14 |
| ES | 2848082 | T3 | * | 8/2021 | H04W 74/0816 |
| ES | 2885438 | T3 | * | 12/2021 | H04W 72/21 |
| JP | 2003324381 | A | * | 11/2003 | |
| KR | 20180053653 | A | * | 5/2018 | G08G 1/096716 |
| TW | 201701625 | A | * | 1/2017 | H04W 76/28 |
| WO | WO-2016070114 | A1 | * | 5/2016 | H04B 17/309 |
| WO | WO-2016154163 | A1 | * | 9/2016 | H04L 5/22 |
| WO | WO-2016191112 | A1 | * | 12/2016 | H04W 74/0816 |
| WO | WO-2020132048 | A1 | * | 6/2020 | H04W 16/14 |
| WO | WO-2023217424 | A1 | * | 11/2023 | H04W 74/0808 |
| WO | WO-2024120624 | A1 | * | 6/2024 | B60R 25/245 |
| WO | WO-2024132100 | A1 | * | 6/2024 | B60R 25/245 |

OTHER PUBLICATIONS

Written Opinion corresponding to International Patent Application No. PCT/EP2023/053622, dated Apr. 6, 2023. (5 pages).

Brunner, Hannah, et al. "Understanding and mitigating the impact of Wi-Fi 6E interference on ultra-wideband communications and ranging." 2022 21st ACM/IEEE International Conference on Information Processing in Sensor Networks (IPSN). IEEE, 2022.

* cited by examiner

SYSTEM AND METHOD FOR VEHICLE COMMUNICATION WITH PORTABLE COMMUNICATION APPARATUS

CROSS-REFERENCE TO RELATED APPLICATIONS

The present application is the U.S. national phase of PCT Application PCT/EP2023/053622 filed on Feb. 14, 2023, which claims priority of German patent application No. DE 10 2022 111 574.7 filed on May 10, 2022, the entire contents of which are incorporated herein by reference.

FIELD

The present disclosure relates to a method and communication device for a vehicle and a portable communication apparatus having such a communication device.

BACKGROUND

Ultra-wideband (UWB) is a wireless system which can be used for high accuracy locating. One application of UWB is in the context of keyless access systems for vehicles. Using UWB, the key fob can be located with the aid of time-of-flight measurements (ToF), by which relay attacks on the keyless access system can be prevented. UWB has also been integrated into smart phones (a mobile telephone that can execute mobile applications), which opens up the possibility that the smart phone can replace the traditional key fob. UWB generally uses four frequency channels (5-6-8-9), which have a center frequency between 6.5 GHz and 8 GHz.

Wi-Fi (a wireless communication standard according to the family of communication standards according to IEEE (Institute of Electrical and Electronics Engineers) standard 802.11, also called wireless local area network (WLAN)) is also used in vehicles for various applications, for example as an Internet access point. The FCC (Federal Communications Commission) has decided to open the 6 GHz communication band for Wi-Fi applications, which means that the coexistence of UWB (channels 5-6) and Wi-Fi in the vehicle is unavoidable.

The four UWB channels can be randomly selected in various vehicles in order to reduce the problem of channel overload between UWB systems. However, the Wi-Fi interference from nearby access points (such as access points of offices and apartments) can have a significant influence on the UWB operation on channels 5 and 6.

Accordingly, it would be advantageous to provide an improved concept for the coexistence of multiple communication systems.

SUMMARY

Various exemplary embodiments of the present disclosure are based on the finding that, during the simultaneous usage of multiple communication systems, for example, in a vehicle, a certain amount of coordination can be carried out between the otherwise independently acting communication systems. In particular, in the case in which it is known that a communication via one of the communication systems is upcoming, the communication via the other communication system can be adapted accordingly. In the present disclosure, this is carried out by a first and a second wireless transceiver, which communicate in a first and in a second communication system. If a communication through the second wireless transceiver is upcoming, the first wireless transceiver can emit a type of "warning signal" or "beacon signal", which prompts the other wireless transceivers that communicate via the first communication system temporarily not to communicate. In this way, the communication via the second transceiver and the second communication system can be carried out undisturbed.

One aspect of the present disclosure relates to a communication device. The communication device comprises at least one interface for communication with a first wireless transceiver. The communication device comprises one or more processors designed to receive information about an upcoming communication via a second wireless transceiver. The one or more processors are designed to control the first wireless transceiver to emit a signal before the upcoming communication via the second wireless transceiver. By emitting the signal, a communication of other wireless transceivers which communicate in the same communication system as the first wireless transceiver can be suppressed, so that the upcoming communication via the second wireless transceiver can be carried out undisturbed.

For example, the one or more processors can be designed to control the first wireless transceiver to emit the signal before the upcoming communication via the second wireless transceiver if a first frequency band, in which the first wireless transceiver communicates, overlaps with a second frequency band, in which the second wireless transceiver communicates. In scenarios where two wireless transceivers communicate in the same or overlapping frequency bands, the proposed warning signal or beacon signal is useful.

The first wireless transceiver can be designed, for example, to communicate according to a listen before talk-based communication standard or according to a carrier sense multiple access-based communication standard. The signal emitted via the first wireless transceiver can be intended to prevent other wireless transceivers, which communicate according to the listen before talk-based communication standard or according to the carrier sense multiple access-based communication standard, from communicating simultaneously with the communication via the second transceiver. The signal is received here by the other wireless transceivers and understood as a notification that another transceiver is in the process of communicating.

In some exemplary embodiments, the upcoming communication via the second wireless transceiver is an ultra-wideband (UWB)-based communication. The one or more processors can be designed to control the first wireless transceiver to transmit the signal according to a communication standard for communication via a local wireless communication network (WLAN/Wi-Fi) in a 6 GHz-based frequency range. The coexistence of UWB and 6 GHz Wi-Fi is one possible application scenario for the present disclosure.

For example, defined messages and signals can be used for the signal transmitted by the first wireless transceiver in the communication protocol according to which the first wireless transceiver communicates. For example, the signal can comprise a beacon signal or a beacon message according to the communication standard for communication via the local wireless communication network in the 6 GHz-based frequency range. The communication of the first wireless transceiver can thus be carried out according to the relevant communication standard.

In some exemplary embodiments, the upcoming communication comprises a transmission signal to be transmitted by the second wireless transceiver. Transmission signals can already be known beforehand, for example, due to the presence of data to be transmitted in a transmission buffer or due to a predefined communication time plan.

In some cases, the communication device can furthermore be designed to carry out the communication via the second wireless transceiver. The at least one interface can thus furthermore be suitable for communication with the second wireless transceiver. The one or more processors can be designed to control the second wireless transceiver to transmit the transmission signal of the upcoming communication to be transmitted after the emission of the signal via the first wireless transceiver. The coordination between the transmission operations via the first and the second transceiver is facilitated in this way.

Under certain conditions, the proposed concept can also be applied to reception signals. The upcoming communication can thus comprise a reception signal to be received by the second wireless transceiver. Information about the upcoming communication can comprise information about an expected reception time or reception time period (for the reception signal to be received). The one or more processors can be designed to control the first wireless transceiver, based on the information about the expected reception time or reception time period, to emit the signal. Such a procedure is possible, for example, with periodic signals, such as periodic time-of-flight measurement signals, for example, in the context of the keyless access to a vehicle.

One aspect of the present disclosure relates to a vehicle having the communication device presented above, the first wireless transceiver, and the second wireless transceiver. In particular, the communication device can be used to improve the coexistence of the first and second wireless transceiver in the vehicle.

On the other hand, the proposed technology can also be used in portable communication apparatuses, such as smart phones or smart watches (intelligent watches). One aspect of the present disclosure relates to a portable communication apparatus having the communication device presented above, the first wireless transceiver, and the second wireless transceiver. The proposed technology can also be used advantageously in portable communication apparatuses, for example, to avoid interference in the context of a runtime measurement.

One aspect of the present disclosure relates to a corresponding communication method. The communication method comprises obtaining information about an upcoming communication via a second wireless transceiver. The communication method comprises controlling a first wireless transceiver to emit a signal before the upcoming communication via the second wireless transceiver.

The communication method comprises a program having a program code for carrying out the above method when the program code is executed on a computer, a processor, a control module, or a programmable hardware component.

BRIEF DESCRIPTION OF THE FIGURES

Several examples of devices and/or methods are explained in more detail solely by way of example hereinafter with reference to the appended figures. In the figures.

DESCRIPTION

Several examples will now be described in more detail with reference to the appended figures. Further possible examples are not restricted to the features of these embodiments described in detail, however. These can have modifications of the features and correspondences and alternatives to the features. Furthermore, the terminology which is used herein to describe specific examples is not to be restricted for further possible examples.

Identical or similar reference signs refer in the entire description of the figures to identical or similar elements or features, which can each be implemented identically or also in modified form, while they provide the same or a similar function. Furthermore, the thicknesses of lines, layers, and/or areas can be exaggerated for clarification in the figures.

If two elements A and B are combined using an "or", this is to be understood to mean that all possible combinations are disclosed, i.e. only A, only B, as well as A and B, if not expressly defined differently in the individual case. As an alternative formulation for the same combinations, "at least one of A and B" or "A and/or B" can be used. This applies equivalently to combinations of more than two elements.

If a singular form, such as "a, an" and "the" is used and the use of only a single element is neither explicitly nor implicitly defined as obligatory, further examples can also use multiple elements to implement the same function. If a function is described hereinafter as implemented using multiple elements, further examples can implement the same function using a single element or a single processing entity. Furthermore, it is apparent that the terms "comprises", "comprising", "includes", and/or "including" describe the presence of the specified features, integers, steps, operations, processes, elements, components, and/or a group thereof when they are used, but at the same time do not exclude the presence or the addition of one or more other features, integers, steps, operations, processes, elements, components, and/or a group thereof.

Figure 1A:
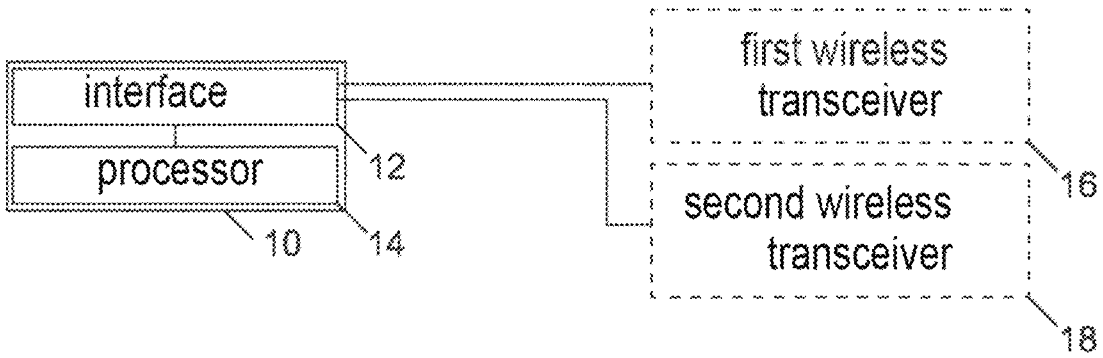
FIG. 1*a* shows a block diagram of an example of a communication device.

FIG. 1*a* shows a block diagram of an example of a communication device 10. The communication device 10 comprises at least one interface 12 for communication with a first wireless transceiver 16. The communication device 10 furthermore comprises one or more processors 14 coupled to the at least one interface 12. In general, the one or more processors 14 are designed to provide the functionality of the communication device 10, for example, in interaction with the at least one interface 12 (for communication with other units). In some examples, the at least one interface 12 is furthermore suitable for communication with a second wireless transceiver 18. For example, the communication device 10 can comprise the first 16 and/or the second 18 wireless transceiver or the wireless transceiver(s) can be arranged outside the communication device 10. In both cases, at least the first wireless transceiver 16 and optionally also the second wireless transceiver 18 can be coupled to the communication device 10, for example, via the at least one interface 12.

The one or more processors 12 are designed to receive information about an upcoming communication via the second wireless transceiver 18. The one or more processors are designed to control the first wireless transceiver to emit a signal before the upcoming communication via the second wireless transceiver.

Figure 1B:
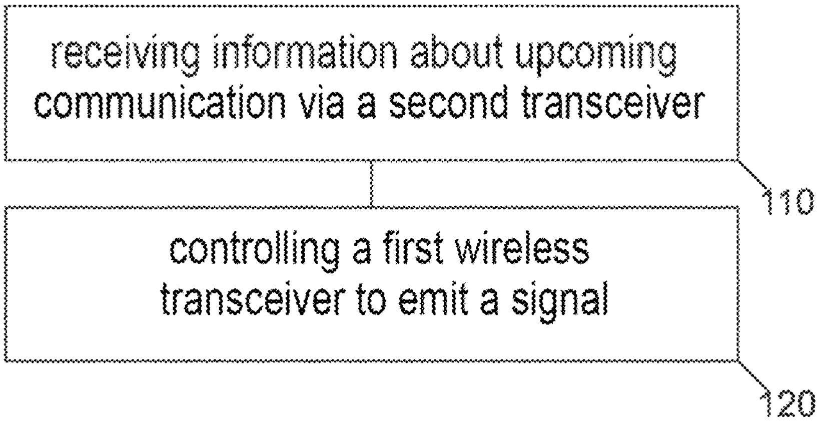
FIG. 1*b* shows a flow chart of an example of a communication method.

FIG. 1*b* shows a flow chart of an example of a corresponding communication method. The communication method can be carried out, for example, by the communication device of FIG. 1*a*, or by another communication apparatus, such as a vehicle (shown in FIG. 2) or a portable communication apparatus (shown in FIG. 3). The communication method comprises receiving 110 the information about the upcoming communication via the second wireless transceiver. The communication method comprises controlling 120 the first wireless transceiver to emit the signal before the upcoming communication via the second wireless transceiver.

The features the of communication device, the communication method, and a corresponding computer program are explained hereinafter with reference to the communication device. Features which are introduced or explained in conjunction with the communication device can also be incorporated into the corresponding communication method or the computer program.

The proposed concept is based on the fact that it is known that a communication via the second wireless transceiver is upcoming (i.e. a communication which is to be carried out via the second transceiver). The communication device is made aware of this via the information about the upcoming communication. This information can originate from multiple sources. For this purpose, three different case groups are now distinguished hereinafter: transmission signals which are not based on a specified time plan, transmission signals which are based on a specified time plan, and reception signals which are based on a specified time plan.

In the case of transmission signals, i.e. when the upcoming communication comprises a transmission signal to be transmitted by the second wireless transceiver, which are not based on a specified time plan, the information about the upcoming communication can be based on a transmission buffer of the second wireless communication apparatus. The one or more processors can be designed to ascertain the information about the upcoming communication by monitoring the transmission buffer or to determine it by receiving a corresponding message via the transmission buffer by way of the second wireless transceiver. The communication device can furthermore coordinate the (transmission) communication of the second wireless transceiver. For example, the one or more processors can be designed to control the second wireless transceiver to transmit the transmission signal of the upcoming communication to be transmitted after the emission of the signal via the first wireless transceiver.

A similar procedure can also be used with transmission signals which are based on a specified time plan. In addition, there is the possibility here that the specified time plan is used as the information about the upcoming communication. The information about the upcoming communication can comprise information (such as a time plan) about an expected transmission time or transmission time period, and the one or more processors can trigger the signal based on the information about the expected transmission time or transmission time period. The one or more processors can also be designed here to control the second wireless transceiver to transmit the transmission signal of the upcoming communication to be transmitted after the emission of the signal via the first wireless transceiver.

In the case of reception signals, i.e. if the upcoming communication comprises a reception signal to be received by the second wireless transceiver, it is again possible to proceed according to a time plan. Information about the upcoming communication can thus comprise information (i.e. a time plan) about an expected reception time or reception time period. The one or more processors can be designed to control the first wireless transceiver based on the information about the expected reception time or reception time period to emit the signal, for example, so that the signal occurs (just) before each of the expected reception time or reception time period.

The one or more processors are designed to trigger the emission of the signal by the first wireless transceiver so that the signal before the upcoming communication, which is carried out via the second wireless transceiver, is emitted. This takes place to prevent or make more improbable a collision between the upcoming communication via the second wireless transceiver and a further communication which takes place in another communication system. Such a collision is to be expected in particular if the upcoming communication via the second wireless transceiver and the further communication are based on the same frequency resources. For example, the one or more processors can be designed to control the first wireless transceiver to emit the signal before the upcoming communication via the second wireless transceiver if a first frequency band, in which the first wireless transceiver communicates, overlaps with a second frequency band, in which the second wireless transceiver communicates. The first wireless transceiver can thus be intended, for example, for communication in a first communication system and the second wireless transceiver can be intended for communication in a second communication system. If the first communication system and the second communication system use the same or overlapping frequency resources, the signal can be emitted. This applies in particular if the communication via the second communication system is based on a lower signal strength, calculated on a carrier frequency (for example, less than 50%, less than 20%, or less than 10% of the signal strength of the first communication system).

Such a scenario prevails in particular in the case of the coexistence of Wi-Fi in the 6 GHz frequency range and ultra-wideband (UWB). For example, the upcoming communication via the second wireless transceiver (i.e. via the second communication system) can be an ultra-wideband-based communication. The first wireless transceiver, in contrast, can be suitable or designed to communicate via a wireless local area network (WLAN, also called Wi-Fi) in a 6 GHz-based frequency range. The one or more processors can therefore be designed to control the first wireless transceiver to transmit the signal according to a communication standard for communication via a wireless local area network in a 6 GHz-based frequency range. As can be inferred from the name, UWB-based communication is based on the use of very wide frequency bands, wherein, calculated on the individual carrier frequency, low signal strengths are used. In this scenario, the technology "listen before talk" (listening before speaking) used by WLAN/Wi-Fi possibly fails, because the signal strength of the UWB-based communication is possibly too low to be detected by the listen before talk detection of the other wireless transceiver of the first communication system. The present concept can therefore be used in particular in a listen before talk-based communication system or the conceptually similar carrier sense multiple access (CSMA)-based communication system. In other words, the first communication system can be a listen before talk-based communication system or a carrier sense multiple access-based communication system. Accordingly, the first wireless transceiver can be designed to communicate according to a listen before talk-based communication standard or according to a carrier sense multiple access-based communication standard. The signal emitted via the first wireless transceiver is intended, for example, to prevent other wireless transceivers, which communicate according to the listen before talk-based communication standard or according to the carrier sense multiple access-based communication standard, to communicate simultaneously with the upcoming communication via the second transceiver.

The WLAN/Wi-Fi communication standard has possible signals, messages, and packets which can be used as the above-mentioned signal. The signal can thus comprise or correspond to a beacon signal or a beacon message (also beacon frame) named according to the communication standard for communication via the wireless local area network in the 6 GHz-based frequency range.

The at least one interface 12 can correspond, for example, to one or more inputs and/or one or more outputs for receiving and/or transmitting information, for example, in digital bit values, based on a code, within a module, between modules, or between modules of different entities. The at least one interface 12 can comprise, for example, an interface circuit, which is designed to carry out the communication of the interface 12.

For example, the one or more processors 14 can correspond to an arbitrary controller or processor or a programmable hardware component. For example, the one or more processors 14 can also be implemented as software programmed for a corresponding hardware component. The one or more processors 14 can insofar be implemented as programmable hardware having correspondingly matched software. Arbitrary processors, such as digital signal processors (DSPs) can be used. Exemplary embodiments are not restricted to a specific type of processor. Arbitrary processors or also multiple processors are conceivable for the implementation.

The first wireless transceiver 16 and the second wireless transceiver 18 can contain typical transmitter or receiver components. These can include, for example, one or more antennas, one or more filters, one or more mixers, one or more amplifiers, one or more diplexers, one or more duplexers, etc.

More details and aspects of the wireless transceivers, the communication device, the communication method, and the computer program will be mentioned in conjunction with the concept or examples which are described above or below (for example in FIGS. 2 and 3). The wireless transceivers, the communication device, the communication method, and the computer program can comprise one or more additional optional features which correspond to one or more aspects of the proposed concept or the described examples as were described above or below.

Figure 2:
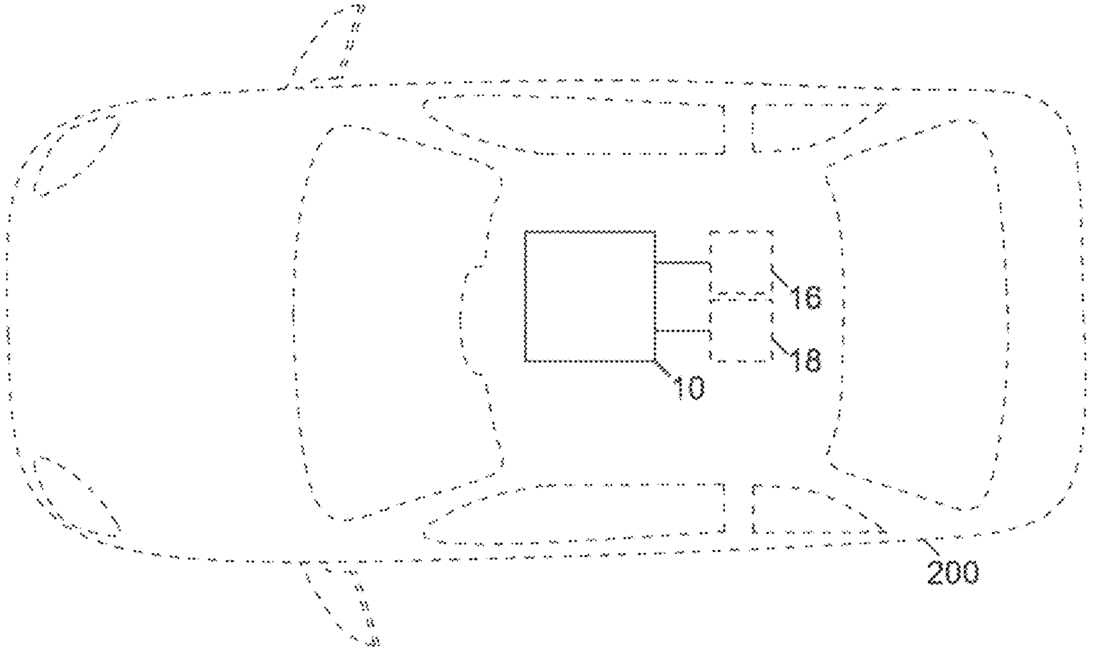
FIG. 2 shows a schematic diagram of an example of a vehicle having a communication device.

FIG. 2 shows a schematic diagram of an example of a vehicle 200 having a communication device 10, such as the communication device 10 was which introduced in conjunction with FIG. 1*a*. The vehicle 200 furthermore comprises the first wireless transceiver 16 and the second wireless transceiver 18, which are each coupled to the communication device 10.

In at least some exemplary embodiments, the vehicle 200 can correspond, for example, to a land vehicle, water vehicle, an aircraft, a rail vehicle, a road vehicle, an automobile, an off-road vehicle, a motor vehicle, or a truck.

More details and aspects of the wireless transceivers, the communication device, and the vehicle will be mentioned in conjunction with the concept or examples which are described above or below (for example in FIGS. 1*a* to 1*b* and 3). The wireless transceivers, the communication device, and the vehicle can comprise one or more additional optional features which correspond to one or more aspects of the proposed concept or the described examples as were described above or below.

Figure 3:
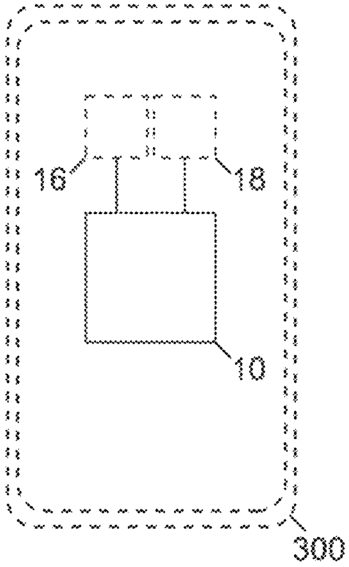
FIG. 3 shows a schematic diagram of an example of a portable communication apparatus having a communication device.

FIG. 3 shows a schematic diagram of an example of a portable communication apparatus 300 having a communication device 10, such as the communication device 10 which was introduced in conjunction with FIG. 1*a*. The portable communication apparatus 300 furthermore comprises the first wireless transceiver 16 and the second wireless transceiver 18, which are each coupled to the communication device 10.

In FIG. 3, the portable communication apparatus is shown as a smart phone. In addition, the portable communication apparatus can also assume other forms. For example, the portable communication apparatus can be a so-called smart watch (an intelligent watch), a tablet computer, or an identification chip. In some embodiments, the portable communication apparatus be can a communication apparatus capable of general communication, i.e. a communication apparatus which is not provided for a single application, such as a vehicle key (key fob). In other embodiments, the portable communication apparatus can be such a communication apparatus intended for a single application, such as a key fob.

More details and aspects of the wireless transceivers, the communication device, and the portable communication apparatus will be mentioned in conjunction with the concept or examples which are described above or below (for example in FIGS. 1*a* to 2). The wireless transceivers, the communication device, and the portable communication apparatus can comprise one or more additional optional features which correspond to one or more aspects of the proposed concept or the described examples as were described above or below.

The present disclosure relates to the improvement of the coexistence of a usage of different communication technologies, and in particular to the improvement of the coexistence of UWB and Wi-Fi in motor vehicles. Wi-Fi which is operated in the 6 GHz band can strongly interfere with UWB and result in worsening of performance. This applies in particular in the case in which Wi-Fi hotspots in private households and offices are viewed as interiors which permit a high transmission power.

Wi-Fi uses the method "listen before talk" (listening before speaking) for the transmission in order to achieve a fair common usage of the spectrum. However, since UWB uses a very weak signal power, the UWB signal cannot be detected by a Wi-Fi transceiver in many cases. The present disclosure is based on the finding that the 6 GHz Wi-Fi unit in the vehicle can be used in order to transmit a signal at high power before each UWB transmission. In this case, the surrounding Wi-Fi access points can postpone their transmission for a brief time span, so that an interference-free UWB transmission is possible. Since the UWB signal is very short, the effects on the surrounding Wi-Fi hotspots are very limited.

The present disclosure can be used, for example, in vehicles which support UWB and Wi-Fi applications or in portable communication apparatuses.

More details and aspects of the concept for improving the coexistence of a usage of different communication technologies will be mentioned in conjunction with the concept or examples which are described above or below (for example in FIGS. 1*a* to 1*b* and 3). The concept for improving the coexistence of a usage of different communication technologies can comprise one or more additional optional features which correspond to one or more aspects of the proposed concept or the described examples as were described above or below.

The aspects and features which are described in conjunction with a specific one of the preceding examples can also be combined with one or more of the further examples to replace an identical or similar feature of this further example or to additionally introduce the feature into the further example.

Examples can furthermore be or relate to a (computer) program having a program code for carrying out one or more of the above methods when the program is executed on a computer, a processor, or another programmable hardware component. Steps, operations, or processes of various ones of the above-described methods can also be carried out by programmed computers, processors, or other programmable hardware components. Examples can also cover program storage devices, e.g., digital data storage media, which are readable by machine, processor, or computer and code or contain machine-executable, processor-executable, or computer-executable programs and instructions. The program storage devices can comprise or be, e.g., digital memories, magnetic storage media such as magnetic drives and magnetic tapes, hard drives, or optically readable digital data storage media. Further examples can also cover computers, processors, control units, (field) programmable logic arrays ((F)PLA), (field) programmable gate arrays ((F)PGA), graphics processors (GPU=graphics processor unit), application-specific integrated circuits (ASIC), integrated circuits (IC), or single-chip systems (SoC=system-on-a-chip), which are programmed to carry out the steps of the above-described methods.

It is furthermore obvious that the disclosure of multiple steps, processes, operations, or functions disclosed in the description or the claims is not to be interpreted as necessarily in the described order, if this is not explicitly specified in the individual case or is not explicitly necessary for technical reasons. Therefore, carrying out multiple steps or functions is not limited to a specific order by the preceding description. Furthermore, in further examples a single step, a single function, a single process, or a single operation can include multiple partial steps, functions, processes, or operations and/or can be broken down thereto.

Although some aspects have been described in the preceding sections in conjunction with a device or system, these aspects are also to be understood as a description of the corresponding method. A block, a device, or a functional aspect of the device or the system can correspond, for example, to a feature, such as a method step, of the corresponding method. Correspondingly thereto, which aspects have been described in conjunction with a method are also to be understood as a description of a corresponding block, a corresponding element, a property, or a functional feature of a corresponding device or a corresponding system.

The following claims are hereby incorporated in the detailed description, wherein each claim can stand as such as a separate example. Furthermore, it is to be noted that—although a dependent claim in the claims refers to a specific combination with one or more other claims—other examples can also comprise a combination of the dependent claim with the subject matter of each other dependent or independent claim. Such combinations are hereby explicitly proposed, provided it is not specified in the individual case that a specific combination is not intended. Furthermore, features of a claim are also to be included by each other independent claim, even if this claim is not defined directly as dependent on this other independent claim.

LIST OF REFERENCE NUMERALS

10 communication device
12 interface
14 processor
16 first wireless transceiver
18 second wireless transceiver
110 receiving information about upcoming communication via a second transceiver
120 controlling a first wireless transceiver to emit a signal
200 vehicle
300 portable communication apparatus

The invention claimed is:

1. A communication device comprising:
at least one interface for communication with a first wireless transceiver; and
one or more processors configured to:
receive information about an upcoming communication via a second wireless transceiver; and
control the first wireless transceiver to emit a signal before the upcoming communication via the second wireless transceiver,
wherein the one or more processors are configured to control the first wireless transceiver to emit the signal before the upcoming communication via the second wireless transceiver when a first frequency band, in which the first wireless transceiver communicates, overlaps with a second frequency band, in which the second wireless transceiver communicates.

2. The communication device as claimed in claim 1, wherein the first wireless transceiver is configured to communicate according to a listen before talk-based communication standard or according to a carrier sense multiple access-based communication standard, wherein the signal emitted via the first wireless transceiver is intended to prevent other wireless transceivers which communicate according to the listen before talk-based communication standard or according to the carrier sense multiple access-based communication standard from communicating simultaneously with the upcoming communication via the second transceiver.

3. The communication device as claimed in claim 1, wherein the upcoming communication via the second wireless transceiver is an ultra-wideband-based communication and the one or more processors are configured to control the first wireless transceiver to transmit the signal according to a communication standard for communication via a wireless local area network in a 6 GHz-based frequency range.

4. The communication device as claimed in claim 3, wherein the signal comprises a beacon signal or a beacon message according to the communication standard for communication via the wireless local area network in the 6 GHz-based frequency range.

5. The communication device as claimed in claim 1, wherein the upcoming communication comprises a transmission signal to be transmitted by the second wireless transceiver.

6. The communication device as claimed in claim 5, wherein the at least one interface is furthermore suitable for communication with the second wireless transceiver, wherein the one or more processors are configured to control the second wireless transceiver to transmit the transmission signal of the upcoming communication to be transmitted after the emission of the signal via the first wireless transceiver.

7. The communication device of claim 6, wherein the communication device, the first wireless transceiver, and the second wireless transceiver are included in a vehicle.

8. The communication device of claim 6, wherein the communication device, the first wireless transceiver, and the second wireless transceiver are included in a portable communication device.

9. The communication device as claimed in claim 1, wherein the upcoming communication comprises a reception signal to be received by the second wireless transceiver, wherein the information about the upcoming communication comprises information about an expected reception time or reception time period, and wherein the one or more processors are configured to control the first wireless transceiver to emit the signal based on the information about the upcoming reception time or reception time period.

10. The communication device of claim 1, wherein the communication device, the first wireless transceiver, and the second wireless transceiver are included in a vehicle.

11. The communication device of claim 1, wherein the communication device, the first wireless transceiver, and the second wireless transceiver are included in a portable communication device.

12. A communication method, comprising:

receiving information about an upcoming communication via a second wireless transceiver; and controlling a first wireless transceiver to emit a signal before the upcoming communication via the second wireless transceiver; and wherein the upcoming communication comprises a transmission signal to be transmitted by the second wireless transceiver.

13. The communication method of claim 12, further comprising:

emitting the signal before the upcoming communication via the second wireless transceiver when a first frequency band, in which the first wireless transceiver communicates, overlaps with a second frequency band, in which the second wireless transceiver communicates.

14. The communication method of claim 13, wherein the first wireless transceiver is configured to communicate according to a listen before talk-based communication standard or according to a carrier sense multiple access-based communication standard, wherein the signal emitted via the first wireless transceiver is intended to prevent other wireless transceivers which communicate according to the listen before talk-based communication standard or according to the carrier sense multiple access-based communication standard from communicating simultaneously with the upcoming communication via the second transceiver.

15. The communication method of claim 14, wherein the upcoming communication via the second wireless transceiver is an ultra-wideband-based communication, the method further comprising controlling the first wireless transceiver to transmit the signal according to a communication standard for communication via a wireless local area network in a 6 GHz-based frequency range.

16. The communication method of claim 15, wherein the signal comprises a beacon signal or a beacon message according to the communication standard for communication via the wireless local area network in the 6 GHz-based frequency range.

17. The communication method of claim 12, further comprising control the second wireless transceiver to transmit the transmission signal of the upcoming communication to be transmitted after the emission of the signal via the first wireless transceiver.

18. The communication method of claim 12, wherein the upcoming communication comprises a reception signal to be received by the second wireless transceiver, wherein the information about the upcoming communication comprises information about an expected reception time or reception time period, the method further comprising controlling the first wireless transceiver to emit the signal based on the information about the upcoming reception time or reception time period.

19. A non-transitory computer readable medium comprising instructions which, when executed on a processor, causes the processor to:

receive information about an upcoming communication via a second wireless transceiver;

control a first wireless transceiver to emit a signal before the upcoming communication via the second wireless transceiver; and emit the signal before the upcoming communication via the second wireless transceiver when a first frequency band, in which the first wireless transceiver communicates, overlaps with a second frequency band, in which the second wireless transceiver communicates.

* * * * *